United States Patent [19]

Sakano et al.

[11] Patent Number: 4,703,729
[45] Date of Patent: Nov. 3, 1987

[54] INTAKE SYSTEM WITH DOUBLE INTAKE PORTS FOR INTERNAL COMBUSTION ENGINE

[75] Inventors: Kenji Sakano; Masahiro Aketa; Tetsuro Ikeshima; Kiyoshi Hataura; Hiroo Sakanaka; Masahiro Yamashita, all of Sakaishi, Japan

[73] Assignee: Kubota Ltd., Osaka, Japan

[21] Appl. No.: 918,134

[22] Filed: Oct. 14, 1986

[51] Int. Cl.$^4$ .............................................. F02B 31/00
[52] U.S. Cl. .................................. 123/308; 123/90.39; 123/52 M; 123/188 M
[58] Field of Search .................. 123/308, 90.16, 90.39, 123/52 M, 188 M, 306

[56] References Cited

U.S. PATENT DOCUMENTS

| | | | |
|---|---|---|---|
| 3,054,390 | 9/1962 | Meurer et al. | 123/188 M |
| 3,824,971 | 7/1974 | Skatsche et al. | 123/188 M |
| 3,861,375 | 1/1975 | Excoffon | 123/188 M |
| 3,903,849 | 9/1975 | List et al. | 123/188 M |
| 4,480,617 | 11/1984 | Nakano et al. | 123/90.16 |
| 4,523,560 | 6/1985 | Motosugi et al. | 123/308 |
| 4,638,773 | 1/1987 | Bonvallet | 123/90.16 |

FOREIGN PATENT DOCUMENTS

58-53632 3/1983 Japan.
59-152138 10/1984 Japan.

*Primary Examiner*—E. Rollins Cross
*Attorney, Agent, or Firm*—Schwartz, Jeffery, Schwaab, Mack, Blumenthal & Evans

[57] ABSTRACT

The present invention relates to an intake system with double intake ports for internal combustion engine, involving two intake ports for each cylinder chamber of the engine, one of the two intake ports being a pure helical port which introduces suction air with helical flow, but without straightway flow, into the cylinder chamber, and another intake port being partially helical port which introduces suction air with helical flow and straightway flow into the cylinder chamber, the outlets of the two intake ports being preferably located in nearer side of the center of the cylinder chamber, and side by side in a parallel direction with the axis of cam shaft; and preferably the pure helical intake port being suspended in lower speed range by pausing device having pause valve which is preferably consisted of suction valve; and the length of suction passage being preferably varied in accordance with the variation of speed ranges.

9 Claims, 11 Drawing Figures

INTAKE SYSTEM WITH DOUBLE INTAKE PORTS FOR INTERNAL COMBUSTION ENGINE

BACKGROUND OF THE INVENTION (1) Field of the invention

The present invention relates to an intake system with double intake ports for internal combustion engine, especially, which is made obtainable high volumetric efficiency and coefficient of air utilization through broad speed range.

(2) Description of prior arts

Figure 1:
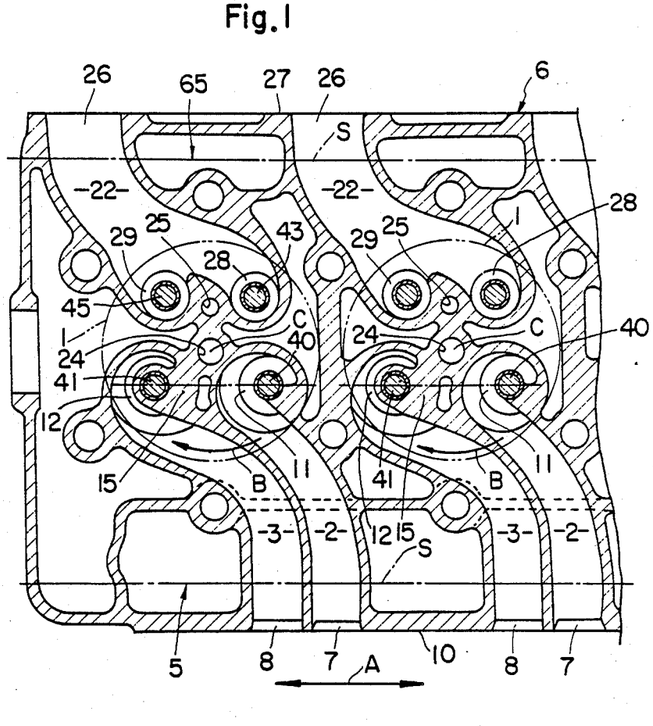
FIG. 1 is a fragmental cross section of a cylinder head of a vertical diesel engine according to the present invention.
Figure 2:
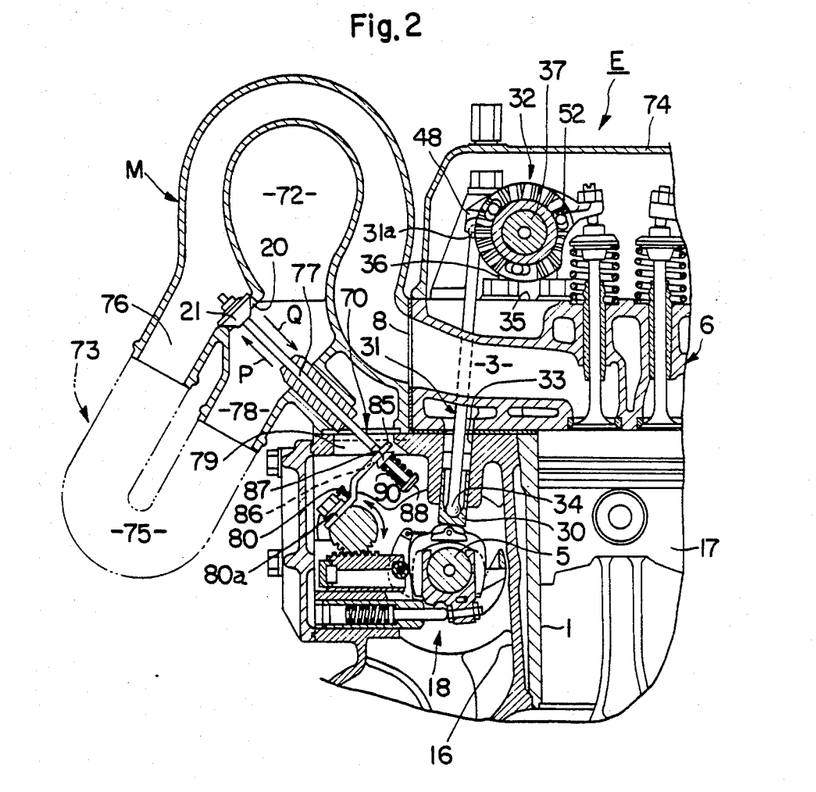
FIG. 2 is a fragmental vertical section of the engine.
Figure 3:
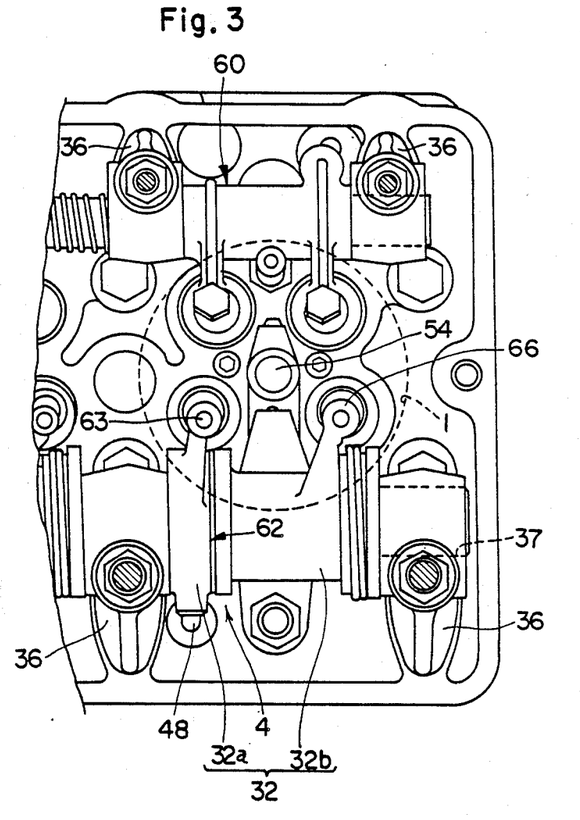
FIG. 3 is a fragmental plane view of the cylinder head.

Generally, a so-called intake system with double intake ports for internal combustion engine, which is provided with two intake ports for each cylinder chamber, is adopted to increase the volume of suction air. Usually, according to such intake system, as seen in FIG. 1, the two intake ports 2, 3 for a cylinder chamber 1 of an internal engine E are formed in the cylinder head 6 and located side by side in the parallel direction A with the axis S of the cam shaft 5 of a valve mechanism 4. The inlets 7, 8 of these intake ports 2, 3 are opened at the same lateral side 10 of the cylinder head 6, and the outlets 11, 12 thereof at the top end 14 of the cylinder chamber 1.

Among such intake systems which is provided with fundamental structure above mentioned, there is one, as described in Japanese official patent No. 52-7485 or U.S. Pat. No. 4,523,560 for example, having an intake port consisted of a directional port and another intake port consisted of a helical port for each cylinder chamber. The directional port is made to introduce suction air without helical flow, and the helical port is made to introduce suction air with helical flow, into the cylinder chamber. In these prior arts, the outlet of the directional port is located farther than the center of cylinder chamber from these inlets, and that of the helical port is located nearer than the center of cylinder chamber to these inlets. And the helical port is bent like a crank in order to arrange the length of these ports about equal.

According to such intake system with double intake ports which are largely varied in the distance from the axis of the cam shaft to each outlet, if the suction valves were arranged to be driven by a common cam shaft, a bridge member and a guide means for guiding its linear action are usually involved in the valve mechanism to harmonize the timings, the lifts and the power for opening of both valves. Therefore, the valve mechanism is made complex and bulky. Moreover, as the helical port is bent like a crank, the resistance against suction air is so large that the swirl and dynamic effects of suction air are weakened to reduce volumetric efficiency. Furthermore, manufacturing of the helical port is difficult for its complex figure. In addition to above, to say nothing of large engine, it is difficult to obtain preferable swirl when usual intake system with double intake ports was adopted to a small diesel engine which requires powerful swirl with many eddies.

By the way, there is such intake system, which has the fundamental structure above mentioned, wherein only one of the two intake ports is used for suction in lower speed range in order to increase volumetric efficiency by speedup of suction flow. According to this intake system, the primary intake port, which is used through whole speed range, is a helical port, as described in Japanese official open patent No. 58-53632 (cf. page 6, from the last line of lower left column to the eighth line of lower right column), for example, in order to produce effective swirl for improvement of volumetric efficiency even in slow speed range and light load condition.

According to this prior art, in higher speed range, the amount of suction air is increased by using two intake ports, and, in this consequence, the volumetric efficiency is increased. However, in higher speed range, as another one of the two intake ports, a directional port, is made to introduce suction air with straightway flow into the cylinder chamber, to say nothing of large engine, the swirl formed in the cylinder chamber is not sufficiently powerful to ensure good combustion in small, high power and high speed engine which especially requires such powerful swirl with many eddies. And, in the lower speed range, the resistance against suction air is largely increased by shutoff of the directional port, so that the volumetric efficiency and coefficient of air utilization drop.

On one hand, among such intake systems, which are provided with the fundamental structure, and which are made to use only one of two intake ports for raise of suction air speed and volumetric efficiency in lower speed range, as seen in Japanese official utility model No. 59-8246, there is one which involves two intake manifolds, having divided passage communicated to corresponding intake port, and a pause valve for closing one of the two divided passages, which valve is shut off in slower speed range.

However, in this prior art, through whole speed range of the engine, both suction valves are active, so that the part of the one divided passage and the intake port following to the pause valve are communicated with the cylinder chamber. Therefore, the back pressure in the cylinder chamber at the suction stroke and the volumetric efficiency are decreased, and the suction air introduced into the cylinder chamber through the other intake port is blown into the pausing intake port to reduce coefficient of air utilization. Thus, the power or torque of the engine cannot be made higher. Moreover, the back pressure is so much decreased to reduce speed of suction air, that the swirl is weakened, and that coefficient of mixing of fuel and air is reduced. Furthermore, it is difficult to shut off the divided passage by the pause valve entirely, and leakage of suction air from cylinder chamber through pausing intake port makes swirl weaker.

On the other hand, among such intake systems, which are provided with the fundamental structure, and which are made to use only one of two intake ports for raise of suction air speed and volumetric efficiency in lower speed range, there is one which involves one of the two suction valves being controlled to pause under slow and small load condition, and an orifice located near the outlets of both intake ports, communicating the pausing intake port to the acting intake port so as to enforce the helical flow of the suction air through the latter, or to produce a helical flow to the suction air introduced through the latter into the cylinder chamber, with air passing through the orifice, as seen in Japanese official open utility model No. 59-179240.

However, according to this prior art, the intake ports are communicated with one another in their way, so that the speed of suction flow is not increased and that it is hard to make swirl more powerful, and volumetric efficiency higher, sufficiently.

Beside them, among such intake systems, which are provided with the fundamental structure and which are made to use only one of two intake ports in lower speed range for raise of suction air speed and volumetric efficiency, and which have two divided intake passages communicated to individual intake ports respectively, and a pause valve which closes one of the two divided intake passages in slower speed range, there is one which further involves a resonance pipe (or air chamber of large volume), to which the two individual intake ports are communicated parallelly and respectively through divided intake passages, as seen in Japanese official open utility model No. 59-152138, for example.

According to this prior art, the speed N of the engine which is harmonious with the natural frequency of pulsation of suction air is concluded as following formula (1), wherein L is the length of intake passage; A is the sectional area of intake passage; V is the volume of the part following to the air chamber of large volume in the intake passage; K is a constant:

$$N = K \sqrt{A/(L \cdot V)} \quad (1)$$

In these parameters, sectional area of intake passage A and the volume V are varied by shutoff of the pause valve. But the length of intake passage L is not variable, so that, it is difficult to vary natural frequency of pulsation of suction air for harmonizing with the speed of the engine through broad speed range. And in a certain speed range, the super-charging by inertia effect is not obtained so sufficiently that the volumetric efficiency cannot be made higher.

SUMMARY OF THE INVENTION

Therefore, the present invention is aimed at obtaining both sufficient volumetric efficiency and sufficient coefficient of air utilization through broad speed range, and at making valve mechanism simple and small.

To this end, an intake system with double intake ports for internal combustion engine, according to the present invention, involves two intake ports, having an inlet and an outlet individually, for each cylinder chamber for an internal engine; said two intake ports are formed in a cylinder head and located side by side in the parallel direction with the axis of the cam shaft in a valve mechanism; said inlets of intake ports are opened at the same lateral side of said cylinder head, and said outlets at the top end of said cylinder chamber; wherein said outlets of both intake ports are located nearer than the center of said cylinder chamber to said inlets thereof, and side by side in the parallel direction with said axis of said cam shaft: one of said two intake ports, which is located in upstream side of swirl formed in said cylinder chamber at the side near to said inlets, is a pure helical port which introduces suction air having helical flow and no straightway flow, and another one is a partially helical port which introduces suction air having helical flow and straightway flow into said cylinder chamber.

According to the present invention, in higher speed range, the sectional area of total intake ports is enlarged by using both intake ports, and the resistance against suction air is not so extremely increased that the amount of suction air is increased.

Moreover, according to the present invention, as the distances from the axis of the cam shaft to each suction valve are equal that a bridge member and a guide means for its linear action of valve mechanism for each cylinder chamber may be omitted whether suction valves are driven directly or via rocker arms intermediating each cam and corresponding suction valve. Accordingly, the structure of the valve mechanism is made simple and small.

Furthermore, according to the present invention, a partially helical port is different from a directional port in introducing helical flow of suction air into the cylinder chamber. In addition to this, as the outlets of both intake ports are located side by side in the parallel direction with the axis of the cam shaft, the distance of one port from the inlet to the outlet thereof is not made so larger than that of the other one. Therefore, it is possible to produce powerful swirl by making the bend of the pure helical port gentle (i.e., a wide arc) to reduce resistance against suction air. Thus, according to the present invention, it is possible to obtain high coefficient of air utilization by production of powerful swirl, while usual intake system with double intake ports is disadvantageous to minimize an engine from that the speed of suction air is reduced to weaken the power of swirl notwithstanding the increase of the amount of suction air. So that, the present invention is adaptable to small engines.

In practicing the present invention, the partially helical port, which is located in the downstream of the pure helical port, is preferablly connected to the cylinder chamber, so as to introduce its straightway flow tangential to the swirl in the cylinder chamber. In this manner, the straightway flow of suction air from the partially helical port is introduced powerful, under the condition of a small resistance against the flow, to increase volumetric efficiency more than that of pure helical port. In addition to this, as the bend of pure helical port is made gentle, the resistance against the suction air through this port is small, and the volumetric efficiency is improved further. In the consequence of increase of volumetric efficiency and the coefficient of air utilization both mentioned above, the torque or power of engine becomes higher.

Still further, according to the present invention, the bend of the pure helical port is made gentle, and its figure is far simpler, and the manufacturing of the pure helical port is far easier than that of usual one which is bent like a crank.

The second preferred embodiment of the present invention relates to an intake system with double intake port for internal combustion engine, especially, in which the one of the two intake port is functionally suspended in lower speed range, and is aimed at improvement of volumetric efficiency and coefficient of air utilization by producing of powerful swirl with many eddies in lower speed range, so as to propose such intake system adaptable to small, high speed and high-power engines.

To this end, an intake system with double intake ports for internal combustion engine, according to the second preferred embodiment of the present invention, involving two intake ports for each cylinder chamber, and a pausing device having a pause valve which is permitted to suspend the function of one of the pair of intake ports in lower speed range, so as to supply suction air through only another port into each cylinder chamber in lower speed range, while said one is suspended by shutoff of said pause valve; wherein, said one of the pair of intake ports is a pure helical port, which introduces suction air with helical flow, but without straightway flow, into said cylinder chamber; said another port is partially helical port, which introduces suction air with helical flow and straightway flow into said cylinder chamber;

said partially helical port is connected with said cylinder chamber so as to introduce said straightway flow of suction air in tangential direction with the swirl formed in said cylinder chamber; said pause valve of pausing device is provided for pure helical port, so as to introduce suction air through only partially helical port into said cylinder chamber, while said pure helical port is functionally suspended by shutting off said pause valve, in lower speed range.

In practice, said pair of intake ports may be formed in the cylinder head, and located side by side in the direction of the axis of cam shaft of valve mechanism, the inlets of both intake ports may be opened at the same lateral side of said cylinder block. As for the outlets of said intake ports, they may be located this and the other side of the center of cylinder chamber from their inlets. However, from the view point of improvements of volumetric efficiency and coefficient of air utilization, together with simplification and minimization of valve system, it is preferable to locate the outlets of these intake ports side by side in the direction of the axis of said cam shaft.

According to the second preferred embodiment of the present invention, in higher speed range, the sectional area of total intake ports is enlarged by using both intake ports, and the resistance against suction air is not so extremely increased that the amount of suction air is increased and that weakening of swirl for the reduction of suction air speed is prevented to improve coefficient of air utilization.

Moreover, according to the second preferred embodiment of the present invention, as the partially helical port is communicated with the cylinder chamber so as to introduce straightway flow of suction air in tangential direction with swirl formed in the cylinder chamber, the straightway flow of suction air is introduced powerfully in to the cylinder chamber along its inner periphery without strong resistance, and higher volumetric efficiency is obtainable in comparison with a pure helical port.

Furthermore, in lower a speed range, as suction air is introduced into the cylinder chamber only through the partially helical port, while the pure helical port is shut, the reduction of suction air speed is small and it is possible to obtain stronger swirl in comparison with the intake system which introduces suction air into the cylinder chamber only through a pure helical port. In addition to this, partially helical port is able to produce straightway flow of suction air, and its resistance against suction flow is small. Therefore, the power of suction air is so strong that sufficientlly high volumetric efficiency is obtainable only by the suction through this port. Thus, it is possible to realize preferable combustion condition, and adaptable to small, high speed and high power engine.

Still further, as mentioned above, as high volumetric efficiency and coefficient of air utilization brought from powerful swirl are obtainable both in lower and higher speed ranges, the property of suction air is not extremely changed at the border range between higher and lower speed ranges, and preferable condition of combustion is constantly obtained.

The third preferred embodiment of the present invention is aimed at proposal of an intake system with double intake ports for internal combustion engine, having two intake ports for each cylinder chamber, and one of the two intake ports is functionally suspended in lower speed range; which engine is made to prevent reduction of volumetric efficiency and coefficient of air utilization during the functional suspension of one intake port.

To this end, an intake system with double intake port for internal combustion engine, according to the third preferred embodiment of the present invention, involving a primary intake port which is used through whole speed range of said engine, a primary intake manifold communicated with said primary intake port, a secondary intake port which is functionally suspended in lower speed range, a secondary intake manifold communicated with said secondary intake port, and an air chamber of large volume, to which said primary and secondary intake manifolds parallelly, and a pausing device having a pause valve which suspends the function of said secondary intake port in slower speed range. A primary passage consisted of said first intake port and first intake manifold, and a secondary passage consisted of said secondary intake port and secondary intake manifold are formed as two individual passages without communication with one another in their way, and a intake valve closing and opening the outlet of said secondary intake port is arranged to serve as said pause valve.

According to the third preferred embodiment of the present invention, as the secondary intake port is arranged to serve as the pause valve, the secondary passage is wholly shut off from the cylinder chamber at the outlet of intake port, so that, on one hand, the reduction of back pressure in the cylinder chamber and coefficient of air utilization by communication of cylinder chamber with the secondary passage are prevented, on the other hand, the blow-by of suction air from the air chamber of large volume to cylinder chamber through secondary passage, so that the volumetric efficiency is made higher by speedup of suction air from concentration of the suction air to the primary passage. In addition to this, as the primary and secondary passages are divided with one another, the enlargement of sectional area of suction path by communication in their way is not realized, so that the speed of suction air is increased to improve volumetric efficiency higher, and to gain more power or torque of the engine. Moreover, by increasing speed of suction air as mentioned above, it is possible to produce powerful swirl in the cylinder chamber, and to improve the coefficient of mixing of air and fuel largely.

The fourth preferred embodiment of the present invention is aimed at the proposal of an intake system with double intake ports for internal combustion engine, involving two intake ports for each cylinder chamber, and one of the two intake ports is functionally suspended in lower speed range; and which is arranged to obtain the harmony between the engine speed and the natural frequency of pulsation of suction air through broad speed range inorder to realize effective supercharging by inertia of suction air.

To this end, an intake system according to the fourth preferred embodiment of the present invention, involving a primary intake passage which is used through whole speed range of said engine, and a secondary intake passage which is functionally suspended in lower speed range, for each cylinder chamber of said engine, an air chamber of large volume which is communicated with atmosphere on one hand, and with each cylinder chamber by said primary and secondary intake passages on the other hand parallelly, and a pausing device having a pausing valve which closes said secondary intake passage in lower speed range, so as to introduce suction air into said cylinder chamber through only said primary intake passage, while said secondary intake passage is functionally suspended, in slower speed range; wherein, said intake system further involves a short cut which cut off a part of said primary intake passage, a switch valve which closes and opens said short cut, and a path switching device which drive said switch valve to open in higher speed range and to close said switch valve in lower speed range.

According to the fourth preferred embodiment of the present invention, the length of primary intake passage is shortened by opening the switch valve in higher speed range, and elongated to full length thereof by closing the switch valve in lower speed range, so that, together with the variation of sectional area and volume of intake passage following to the air chamber of large volume, accomodated with the speed range of the engine, it is possible to make natural frequency of pulsation of suction air harmonious with the speed of engine or the frequency of valve motion. Moreover, it is possible to make the length and sectional area of intake passage smaller in comparison with such intake system that is provided with a short cut in a gathering pipe, after which the primary and secondary intake passages are divided from one another, for shortening of the pipe, a switch valve to close and open the short cut, and a path switching device to control the switching valve, so that the intake system according to the fourth preferred embodiment of the present invention contributes for minimization of engine.

BRIEF DESCRIPTION OF THE DRAWINGS

The invention is more clearly and precisely set forth in the following detailed description of the preferred embodiment with reference the attached drawings, wherein.

DETAILED DESCRIPTION OF THE PREFERRED EMBODIMENT

The vertical engine E involves a plurality of cylinder chamber 1, formed in a cylinder block 16, and a piston 17 is inserted slidable up and down freely in every cylinder chamber 1. And the top of cylinder chamber 1 is defined by a cylinder head 6 which is fixed on the cylinder block 16

In the cylinder head 6, a primary intake port 3, a secondary intake port 2, exhaust port 22, through hole 24 for installation of an unit injector 54, a hole 25 for installation of a glow plug 55 are formed. The primary port 3 is used through whole speed range of the engine E, and communicated with an air chamber 72 of large volume by a primary intake manifold M. And, the secondary intake port 2 is functionally suspended in slower speed range by a pausing device 62, and also communicated with the air chamber (a surge tank) 72 by a secondary intake manifold (not shown).

The primary intake manifold M, as described later, is provided with a path switching device 70 which shortens the length of intake passage in a higher speed range.

A cam shaft 5 for suction valves 40, 41 is laid in front of a group of cylinder chambers 1, and elonged in right and left direction, and a cam shaft 65 for exhaust valves 43, 45 is laid in the rear of them, and elonged in right and left direction, too. The intake ports 2, 3 is located side by side in the direction of the axis S of the cam shaft 5 (in FIG. 1, the same sign s is given to the axis of the other cam shaft 65 for that the directions of their axes are the same), and the inlets 7, 8 are opened at the front lateral side 10 of the cylinder head 6. The outlet 26 of the exhaust port 22 is opened at the rear lateral side 27 of the cylinder head 6.

Figure 6:
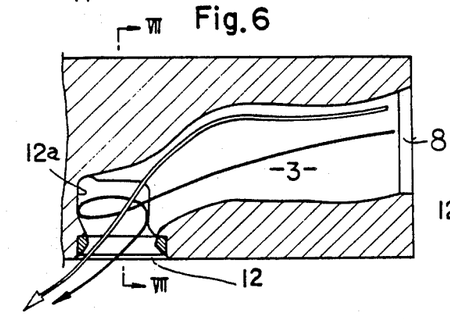
FIG. 6 is a vertical section of a partially helical port.
Figure 7:
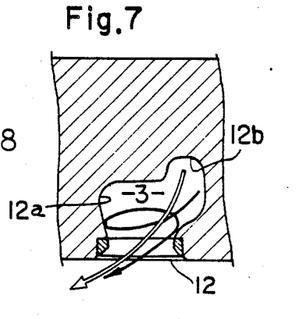
FIG. 7 is a vertical section along VII—VII line in FIG. 6.

The primary intake port 3 is a partially helical port, as seen in FIGS. 6 and 7, which introduces suction air with helical flow and straightway flow. Namely, the outlet 12 of the primary intake port 3 has a cylindrical part 12a which produces helical flow, and another elliptical part 12b elongated straightway toward the outlet 12 for producing a straight way flow of suction air.

Figure 8:
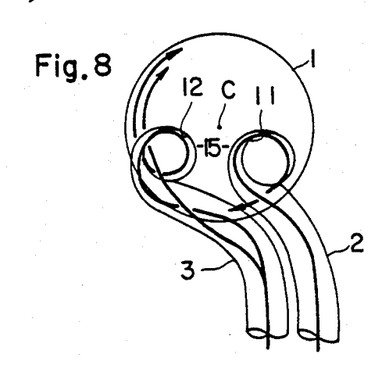
FIG. 8 is an illustration of the flows of suction air introduced by both intake ports.

The outlet 12 of the primary inlet port 3 is located nearer to the inlet 8 than the center C of the cylinder chamber 1, and, as seen in FIG. 8, formed to be communicated with the cylinder chamber 1 so as to introduce the straightway flow of suction air in tangential direction with the flow of swirl (in this case, the swirl is flowing in clockwise direction B along the inner periphery of the cylinder chamber 1) in the cylinder chamber 1. As the straightway flow of suction air from the primary intake port 3 is introduced in tangential direction with the swirl formed in the cylinder chamber 1, the flow is a powerful flow in the cylinder chamber 1 along the inner perphery thereof under a condition with a small resistance against suction air, so that, it is possible to obtain higher volumetric efficiency than with a pure helical port.

By the way, the fact is examined through some experiments that the partially helical port produces swirl which emphasis is maximum at distant portion from the center c of the cylinder chamber, i.e., at the vicinity of the inner periphery of the cylinder chamber 1, for the influence by the straightway flow, while pure helical port produces powerful swirl evenly without relation with the deflection from the center C of the cylinder chamber 1.

Figure 4:
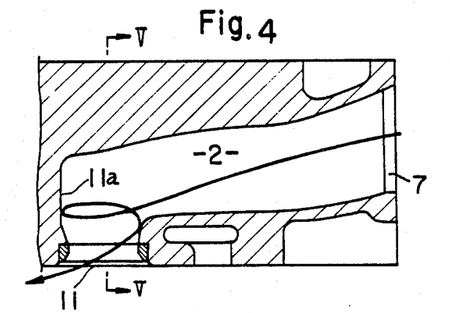
FIG. 4 is a vertical section of a pure helical port.
Figure 5:
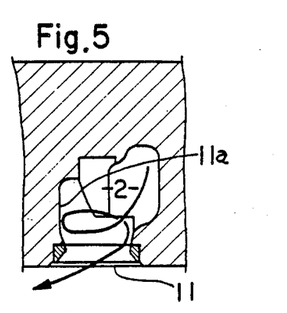
FIG. 5 is a vertical section along V—V line in FIG. 4.

As seen in FIGS. 4, 5 and 8, the secondary intake port 2 is a pure helical port which introduces suction air with helical flow, but without straightway flow. Namely, the outlet 11 of the secondary intake port 2 is provided with a cylindrical interior wall 11a.

The secondary intake port 2 is located in upside of the flow of swirl, which direction is designated by an arrow B, to the primary intake port 3 at near side of the center C of the cylinder chamber 1 to the inlets 7, 8. And, the outlet 11 of the secondary intake port 2 is located side by side with the outlet 12 of the primary intake port 3 in the parallel direction of the axis S of the cam shaft 5.

As the outlets 7, 8 of both intake ports 2, 3 are located side by side in the direction of the axis of the cam shaft 5, as described above, the length from the inlet 7 to the outlet 11 of the secondary port 2 is not so extremely longer than that of the other one. Therefore, the bend of pure helical port, that is, the secondary intake port 2 is made so gentle that the resistance against suction air thereof is decreased to produce more powerful swirl. Thus, according to this embodiment, it is possible to obtain high coefficient of air utilization by production of powerful swirl, while usual intake system with double intake ports is disadvantageous to minimize an engine from that the speed of suction air is reduced to weaken the power of swirl notwithstanding the increase of the amount of suction air.

Moreover, in addition to that the straightway flow of suction air from primary intake port 3 is introduced in tangential direction with the swirl formed in the cylinder chamber 1 for improvement of volumetric efficiency, as the bend of the secondary intake port 2 is made gentle, it is possible to make volumetric efficiency higher than with the usual pure helical port which is bent like a crank, because of the reduction of resistance against suction air. Thus, the torque or power of the engine E is increased.

Furthermore, according to this embodiment, the figure of the secondary intake port 3 of pure helical port is far simpler, and the manufacturing thereof is easier than the usual one which is bent like a crank, as the bend of the port 3 is made gentle.

If both intake ports 2, 3 were used in a lower speed range, the total sectional area of intake passage is so large that power of the engine E is decreased because of the reduction of volumetric efficiency and coefficient of air utilization by speeddown of suction air. In order to decrease effective sectional area of intake passage for preventing such reduction of power, one of the intake ports (the secondary intake port 2) may be functionally suspended, and suction air is introduced into the cylinder chamber 1 through only the other intake port (primary intake port 3). In case that the secondary intake port 2 is functionary suspended as above mentioned, it is possible to adopt the manner in which a pause valve is disposed at the secondary intake manifold communicated with the secondary intake port, so as to close the pause valve in a lower speed range for preventing reduction of suction air speed. However, in this embodiment, the secondary suction valve 40 is made to serve as the pause valve which suspends the function of the secondary intake port 2, taking into account that the longer the length of suction following to the pause valve, the greater is the reduction in volumetric efficiency and coefficient of air utilization.

As mentioned below, both intake valves 40, 41 for each intake ports 2, 3 are opened and closed by a valve mechanism 4. This valve mechanism 4 involves a pausing device 62 which suspends the opening motion of secondary suction valve 40 in a lower speed range.

In particular, both intake valves 40, 41, which open and close the outlets 11, 12 of the intake ports 2, 3 individually are driven by the cam shaft 5 via a rocker arm assembly 32, a push rod 31, a tappet 30 and a timer 18.

A shaft 37 for supporting the rocker arm assembly 32 is supported on the top wall 35 of the cylinder head 6 by a plurality of brackets 36. The rocker arm assembly 32 involves a primary rocker arm 32a which drives the primary suction valve 41, a secondary rocker arm 32b which drives the secondary suction valve 40, a rocker arm 49 which drives a unit injector 54, and the pausing device 62. Among these rocker arms 32a, 32b, 49, secondary rocker arm 32b is mounted slidable along the axis of the shaft 37.

The pausing device 62 involves a pair of mate dog gears 62a, 62b, one of which is formed at one end of the primary rocker arm 32a, and the other one at opposed end of the secondary rocker arm 32b to the one end of the primary rocker arm 32a. And the pausing device 62 also involves a hydraulic activator, which is disposed between the rocker arms 49, 32b, for driving the dog gears 62b toward engaging direction F, and a plurality of biasing springs 62, which are disposed between the rocker arms 32a, 32b for biasing it toward disengaging direction D.

Figure 9:
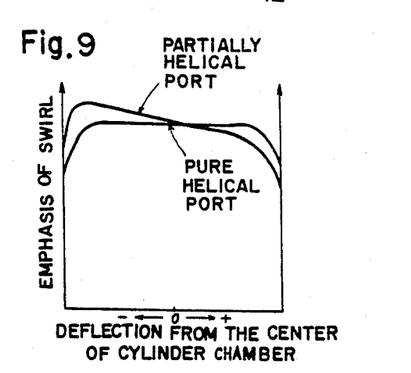
FIG. 9 is an illustration of the relation between the emphasis of swirl and the position from the center of the cylinder chamber.
Figure 10:
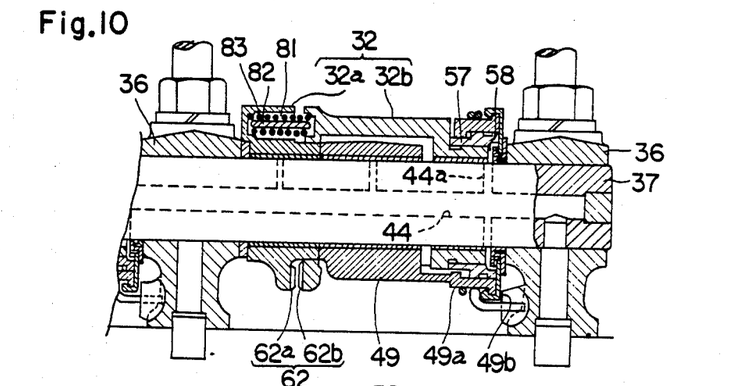
FIG. 10 is a vertical section of the rocker arm assembly.
Figure 11:
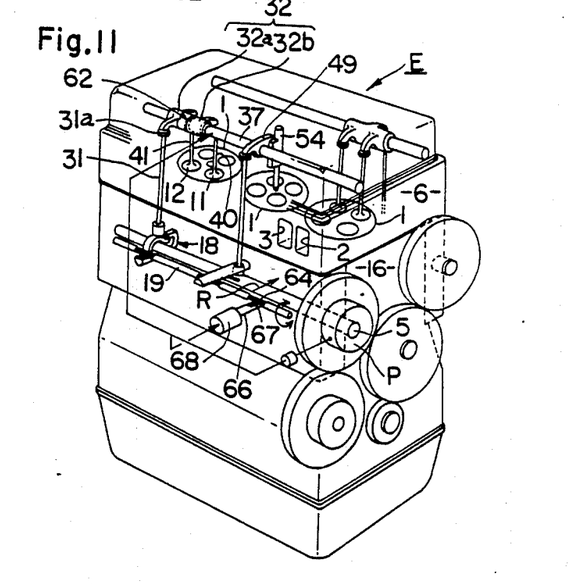
FIG. 11 is a schematic illustration of power train conserning to the present invention.

In detail, the rocker are 49 is located in middle of the middle portion 46 between two brackets 36, the primary rocker arm 32a at one side (left side in FIG. 9), and the secondary rocker arm 32b at the other end of the rocker arm 49. The rocker arm 49 has a sleeve 49a covering the right end of second rocker arm 32b, and an oil-tight end wall 4b fitted to the right end of the sleeve 49b. A guide 57 is inserted between the right end of second rocker arm 32b and the sleeve 49a, and the pressure chamber 58 of the hydraulic actuatur is defined by the right end of second rocker arm 32b, the guide 57, end wall 4b and the shaft 37. The pressure chamber 58 is communicated with a booster pump P via an oil passage 44 and branched oil passage 44a both formed in the shaft 37. The feeding pressure of the pump P is varied in direct proportion with the speed of the engine E. And a plurality of recesses 81 for holding spring, which are located by proper distance in circular direction, are formed at the right end of the primary rocker arm 32a, so as to insert the biasing spring 83, which biases the secondary rocker arm 32b toward disengaging direction D. Moreover, a core 82 is inserted in the spring 83 for rectification of the spring 83.

The primary rocker arm 32a has a dynamic end 63 which is contacted with the top 31a of the push rod 31, and a working end 48 which is met with and separated from the top 47 of the primary suction valve 41. The secondary rocker arm 32b has a working end 66 which is met with and separated from the top of the secondary suction valve 40. The tappet 30 receiving the bottom 34 of the push rod 31 is guided by the hole 33 for the push rod 31.

According to this pausing device 62, when the speed of engine E was over a predetermined speed, for example 3200 rpm, the inner pressure of the pressure chamber 58 overcomes the biasing power of the spring 83, and the dog gears 62b is moved toward the engaging direction F to be engaged with the mate dog gears 62a. Thus, the primary and secondary rocker arms 32a, 32b work together to open and close both suction valves 41, 40. When the speed of engine E were lower than the predetermined speed, the inner pressure of the pressure chamber 58 becomes weeker than the biasing power of the spring 83, and the secondary rocker arm 32b is moved toward disengaging direction D to disengage the dog gears 62a, 62b from one another. Thus, the motion of the primary rocker arm 32a is not transmitted to the secondary rocker arm 32b, and the secondary suction valve 40 is kept closing.

As described above, according to this intake system, in higher speed range, since both intake ports 2, 3 are used to enlarge the sectional area of intake passage, the amount of suction air is increased by reduction of resistance against suction air. Moreover, in lower speed range, as the primary intake port is a partially helical port, the volumetric efficiency is improved by the straightway flow of suction air, and the coefficient of air utilization is also improved by producing eddies in the swirl at the cylinder chamber 1 with the helical flow of the suction air, so that, the preferable condition of combustion is realized as well as in the higher speed range, and that the property of suction air is not so extremely changed in the border range between lower and higher speed ranges. Therefore, this intake system is adoptable even for a small, high speed and high power engine.

Moreover, according to this intake system, as the distances from the axis S of the cam shaft 5 to the outlets 7, 8 of each intake port 2, 3 are equal to that of one another, a bridge member intermediating between the primary and secondary rocker arms 32a, 32b, and a guide mechanism for guiding it can be omitted, and the valve mechanism 4 is made simple and small.

Furthermore, in this intake system, a path switching device 70 is provided for itself, in order to realize effective supercharging by inertia effect of suction air.

The primary intake manifold M, which is used in whole speed range, involves a detour 73 and a short cut 20 which cut off the detour 73, and the middle part 75 of the detour 73 is made as an removable separate part.

The path switching device 70 involves a switch valve 21 which closes and opens the short cut 20, a stem 77 connected with the switch valve 21, a support 80 which support the stem 77, and an absorbing spring 90 which absorbs the overaction of the support 80 to the stem 77, and a common shaft 19 as an power source.

The common shaft 19 having a spherical gear 64 which is engaged with a rack gear 67 formed on a driving rod 66, is located in front of the cam shaft 5 in the cylinder block 16, and contribute to make each lag timer 89, which is inserted between each tappet 30 and the cam shaft 5, in cooperation. The driving rod 66 is driven by a booster 68 communicated with the booster pump P.

The fixed end 80a of the support 80 is fixed on the common shaft 19, and the free end 85 thereof has an elliptical hole 86. The lower portion of the stem 77 is inserted slidably in this elliptical hole 85. The spring 90 and a movable spring seat 87 are inserted between the free end 85 of the support 80 and a fixed spring seat 88 formed at the botton of the stem 77. In a higher speed range, the booster 65 drives the driving rod 66 to the direction R, and the common shaft 19 is rotated in the anticlockwise direction. Consequently, the free end of the support 80 pushes up the switch valve 21 to the direction P by the stem 77, and the short cut 20 is opened to short the upper part 78 of the detour 73 with the lower part 76 thereof. On the contrary, in a lower speed range, the support 80 pushes the switch valve 21 down by the absorbing spring 90 and the stem 77 to close the shortcut 20. When the speed range, through which the secondary suction valve is closed, and the speed range, through which the path of suction is shortened, were different, the natural frequency of the pulsation of suction air may be varied more finely in correspondence with the variation of engine speed.

Additionally, the exhaust port 22 involves an outlet 26 opened at the rear lateral side 27 of the cylinder head 6, and two inlets 28, 29 which are located side by side in the direction of the axis S of the cam shaft 65, and the exhaust valve 43, 45, which closes and opens these inlets 28, 29, are driven by the cam shaft 65 via a valve mechanism 60 which has similar structure to the valve mechanism 4 for suction valves. Therefore, as the distances from each exhaust valve 43, 45 to the cam shaft 65 are equal to one another, as well as the suction valve mechanism 4, it is possible to make exhaust valve mechanism 60 is made simple and small, by omitting a bridge member and a guide mechanism for it.

We claim:

1. An intake system with double intake ports for an internal combustion engine, comprising two intake ports, having an inlet and an outlet individually, for each cylinder chamber of an internal combustion engine; said two intake ports being formed in a cylinder head and located side by side in the parallel direction with the axis of the cam shaft in a valve mechanism; said inlets of the intake ports being opened at the same lateral side of said cylinder head, and said outlets at the top end of said cylinder chamber, wherein:

said outlets of both intake ports being located nearer to the center of said cylinder chamber than said inlets thereof, and side by side in the parallel direction with said axis of said cam shaft;

one of said two intake ports, which is located in upstream side of swirl formed in said cylinder chamber at the side near to said inlets, being a pure helical port which is arranged to introduce suction air having helical flow and no straightway flow, and another one being a partially helical port which is arranged to introduce suction air having both a helical flow and a straightway flow into said cylinder chamber, the pure helical port being gently arcuate in one general direction along its length and the partially helical port being disposed adjacent to and along the pure helical port and being gently arcuate in said one general direction.

2. An intake system recited in claim 1, wherein;

said partially helical port, which is located in the downstream of the pure helical port, is preferablly connected to the cylinder chamber, so as to introduce its straightway flow tangential to the swirl in the cylinder chamber.

3. An intake system with double intake ports for internal combustion engine, involving two intake ports for each cylinder chamber, and a pausing device having a pause valve which is permitted to suspend the function of one of the pair of intake ports in lower speed range, so as to supply suction air through only another port into each cylinder chamber in lower speed range, while said one is suspended by shutoff of said pause valve, wherein;

said one of the pair of intake ports is a pure helical port, which introduces suction air with helical flow, but without straightway flow, into said cylinder chamber; said another port is partially helical port, which introduces suction air with helical flow and straightway flow into said cylinder chamber;

said partially helical port is connected with said cylinder chamber so as to introduce said straightway flow of suction air in tangential direction with the swirl formed in said cylinder chamber;

said pause valve of said pausing device is provided for said pure helical port, so as to introduce suction air through only partially helical port into said cylinder chamber, while the function of said pure helical port is shutoff, in a lower speed range.

4. An intake system with double intake ports for an internal combustion engine, comprising a primary intake port which is used through a whole speed range of said engine, a primary intake manifold communicated with said primary intake port, a secondary intake port which is functionally suspended in a lower speed range, a secondary intake manifold communicated with said secondary intake port, and an air chamber of larger volume and parallel to said primary and secondary intake manifolds, and a pausing device having a pause valve which suspends the function of said secondary intake port in slower speed range, wherein;

a primary intake passage comprising said primary intake port and said primary intake manifold, and a secondary intake passage comprising said secondary intake port and said secondary intake manifold, said primary and secondary passages being independent such that they do not communicate with each other, and an intake valve closing and opening the outlet of said secondary intake port and being arranged to serve as said pause valve.

5. An intake system with double intake ports for internal combustion engine, involving a primary intake passage which is used through whole speed range of said engine, and a secondary intake passage which is functionally suspended in lower speed range, for each cylinder chamber of said engine, and air chamber of large volume which is communicated with atmosphere on one hand, and with each cylinder chamber by said primary and secondary intake passage on the other hand parallelly, and a pausing device having a pausing valve which closes said secondary intake passage in lower speed range, so as to introduce suction air into said cylinder chamber through only said primary intake passage, while said secondary passage is functionally suspended, in slower speed range, wherein;

said intake system further involves a short cut which shortens said primary intake passage, a switch valve which closes and opens said short cut, and a path switching device which drives said switch valve to open in higher speed range and to close said switch valve in lower speed range.

6. An intake valve as claimed in claim 1, wherein each inlet port describes a wide arc in only one general direction transverse to a longitudinal axis of said cylinder chamber.

7. An intake valve as claimed in claim 2, wherein both of said ports are configured to promote swirl about said cylinder chamber in a same direction.

8. An intake system as claimed in claim 3, wherein both of said ports are configured to promote swirl about said cylinder chamber in a same direction.

9. An intake system as claimed in claim 4, wherein said primary intake port comprises a partially helical flow port and said secondary intake port comprises a pure helical port.

* * * * *